O. H. THELEEN.
FLUSHING MECHANISM.
APPLICATION FILED APR. 7, 1919.
1,423,888.
Patented July 25, 1922.
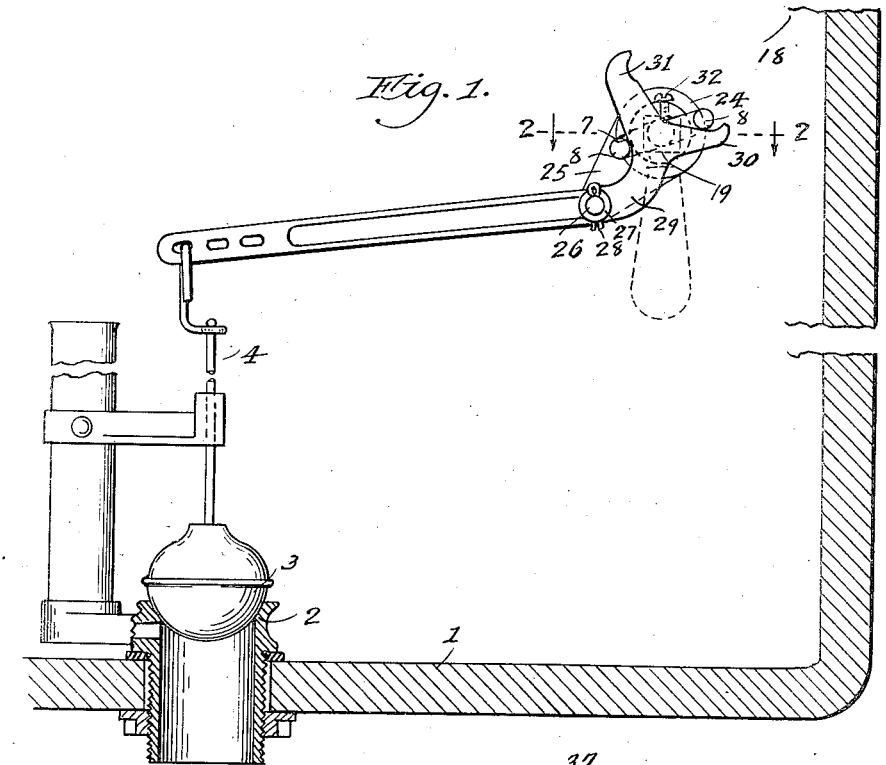
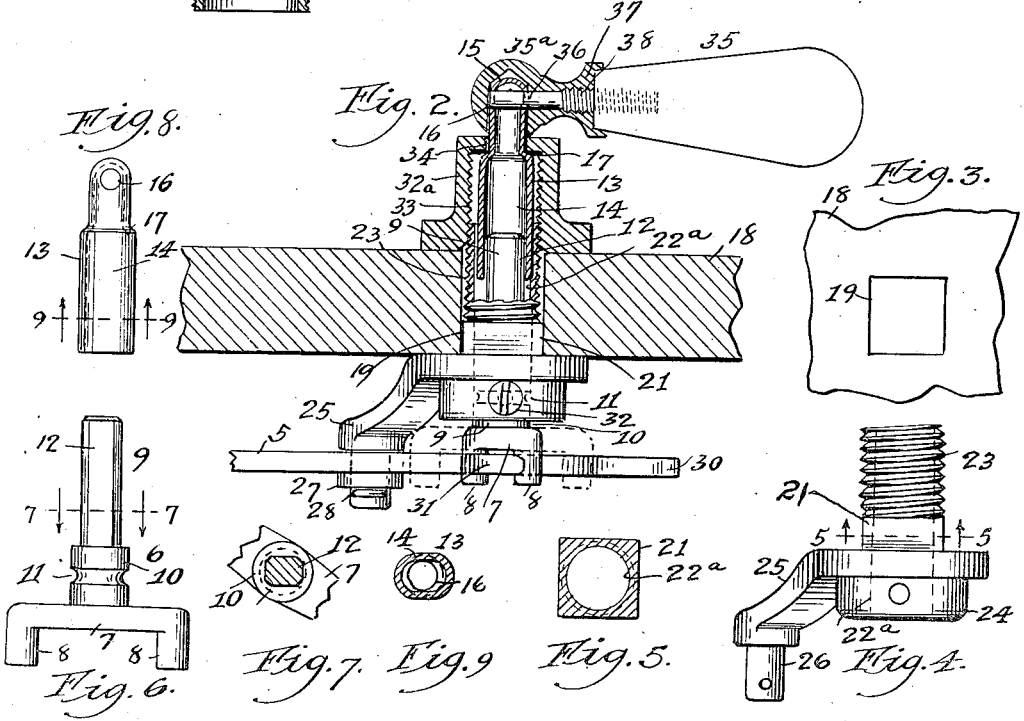

UNITED STATES PATENT OFFICE.

OSCAR H. THELEEN, OF KENOSHA, WISCONSIN, ASSIGNOR TO FROST MANUFACTURING COMPANY, OF KENOSHA, WISCONSIN, A CORPORATION OF WISCONSIN.

FLUSHING MECHANISM.

1,423,888.

Specification of Letters Patent. Patented July 25, 1922.

Application filed April 7, 1919. Serial No. 288,196.

*To all whom it may concern:*

Be it known that I, OSCAR H. THELEEN, a citizen of the United States, residing in the city of Kenosha, county of Kenosha, and State of Wisconsin, have invented certain new and useful Improvements in Flushing Mechanisms, of which the following is a specification.

This invention relates to improvements in mechanisms for flushing tanks and refers more particularly to improvements in valve operating leverage mechanism.

Among the salient objects of the invention, are to provide a construction which can be readily attached to tanks having walls of various thicknesses without the necessity of practically taking the mechanism entirely apart in order to assemble it into position; to provide a construction which is reliable in operation, economical in manufacture and is adapted for use with various types of flush valves.

In the drawings:

Fig. 1 is a vertical section through the flushing tank showing the general arrangement of parts.

Fig. 2 is a cross section on line 2—2 of Fig. 1 with parts broken away for clearness of illustration, and parts in changed relation to each other.

Fig. 3 is a fragmentary view of part of the tank wall.

Fig. 4 is a detail view of a bearing casting.

Fig. 5 is a cross section taken on the line 5—5 of Fig. 4, looking in the direction of the arrows.

Fig. 6 is a detail view of part of a rock shaft.

Fig. 7 is a cross section taken on line 7—7 of Fig. 6 looking in the direction of the arrows.

Fig. 8 is a detail view of an extension part of the rock shaft.

Fig. 9 is a cross section taken on the line 9—9 of Fig. 8 looking in the direction of the arrows.

Referring to the particular embodiment of my invention shown in the drawings, 1 designates a flushing tank provided with the usual outlet 2. Communication through the outlet is controlled by means of a float valve 3 suspended by a link 4 from the operating lever 5, these parts being arranged so that the rocking of the lever 5 causes the float valve to be lifted thereby bringing the flushing tank into operation.

The shaft for rocking the lever is of novel construction, consisting of a member 6 having a cam head 7 provided with studs 8. The shank 9 of the member 6 has a round portion 10 having a circumferential groove 11 and an extended flattened portion 12. An adjustable member 13 is provided with a hollow flattened portion 14 adapted to telescope the flattened end 12, of the member 6, and terminates in a rounded extension 15 having an aperture 16 near the end thereof and a shoulder 17 at the juncture of the hollow flattened portion 14 with the rounded portion 15. In the wall 18 of the tank 1 is an aperture 19 squared to receive a bearing A. The bearing member A is adapted to be secured in the aperture 19 by reason of the squared portion 21 of the shank, which shank portion is externally threaded as shown at 23. A head 24 of the bearing member is integrally formed with the shank portion thereof and the shank and head are longitudinally bored as indicated at $22^a$ to receive the rounded portion 10 of the rock shaft 6. An arm 25 extends from the head 20 and has a stud 26 upon which stud is fulcrumed the lever 5. A collar 27, and cotter pin 28 furnish means for securing the lever upon the stud 26. Lever 5 is formed with an upwardly extending end portion 29 having arms 30 and 31. In assembling the parts described the bearing member A is adjusted in the squared aperture in the tank wall, with the member 6 of the rock shaft inserted in the bore $22^a$ and secured therein by the screw 32 threaded in the head, said screw extending into the groove 11 of the rounded portion 10 of the member 6.

The cam head 7 of the member 6 is adjusted to receive the arm 31 of the lever 5 between the studs 8 thereof, thereby insuring operative engagement with the lever in either direction of movement of the cam head. The adjustable member 13 is inserted into the bore $22^a$ and caused to telescope the flattened end 12 of the shank 9. An escutcheon nut $32^a$ is provided with internal threads 33 and a round aperture 34. Through the aperture 34 is projected the round portion 15 of the member 13. To the round portion 15 of the member 13 is secured an operating handle 35. The assembling of head 35ª of the handle 35 with a grip portion 37 causes an extended stud 36 to enter the aperture 16 in the member 13.

The stud 36 is secured in the grip portion 37 of the handle 35 and threaded as shown at 38 whereby the grip portion of the handle is screw threadedly secured with the head portion 35ª causing the pin 36 to enter the aperture 16 and securely hold the handle with the member 13 of the rock shaft, with the escutcheon nut 32 secured between the head 35ª of the handle and the shoulder 17 of the member 13. The internal threads 33 of the escutcheon nut 32 engage the threads 23 of the bearing member A and thereby adjustment for variable wall thicknesses and corresponding rock shaft lengths is provided.

The advantage of accessibility to the various parts for assembling or repair, is apparent and I do not limit the invention to exact details of construction except as designated in the claims.

In the drawings I have shown one form of construction for carrying out the invention. It is apparent however, that the invention is not limited to the particular form shown in the drawings, but that various other forms may be adopted and still be within the scope of the invention. I claim broadly a divided shaft regardless of the form of said shaft or the number of parts from which said shaft may be made.

I claim as my invention:

1. In leverage mechanism, for closet tanks the combination with a fixed bearing, of a divided rock shaft journaled therein, means cooperating with said fixed bearing for holding the shaft sections in fixed adjustment, a handle secured to one part of the shaft, said part adapted to engage the other part of the shaft in longitudinally adjustable contact and transverse angular non-rotative engagement with each other and means whereby the rock shaft is held in the bearing.

2. In leverage mechanism, the combination with a fixed bearing comprising a member having a shank, said shank terminating in a round externally threaded portion, a divided longitudinally adjustable shaft having a handle on one portion thereof, a shoulder on the same part of the shaft, a nut adapted to engage the shoulder of the shaft and having threaded engagement with the threaded extension of the bearing.

3. In leverage mechanism, for closet tanks the combination with a fixed bearing of a divided rock shaft secured therein having a cam head whereby the rocking of the rock shaft in either direction will operate suitable valve mechanism and means cooperating with said fixed bearing for holding the shaft sections in an adjusted position.

4. In leverage mechanism, for closet tanks the combination with a fixed bearing of a rock shaft comprising separable parts disposed therein having a cam head, pins on the cam head and a pivoted valve lever actuated by the pins whereby to operate the valve and means cooperating with the fixed bearing for holding the shaft sections in their adjusted positions.

5. A device of the character described, comprising a bearing member having a threaded extension formed with an opening therein, of a lever operating shaft composed of sections having a non-rotative connection with each other, means carried by the bearing for maintaining one section in position, and a bearing cap cooperating with said bearing and serving to retain the other section of the shaft in position.

6. A device of the character described, comprising a bearing member having a threaded extension formed with an opening therein, of a lever operating shaft composed of sections having a non-rotative connection with each other, means carried by the bearing for maintaining one section in position, and a bearing cap cooperating with said bearing and serving to retain the other section of the shaft in position, a handle connected with one section, and lever operating means carried by the other section.

7. A device of the character described, comprising a bearing member of elongated formation, an operating shaft section journaled in said bearing, a lever operated thereby, a second shaft section fitted to the first mentioned section, a bearing cap adapted to be connected with the bearing and supporting said last mentioned shaft section, and means on said second shaft section for rotating the shaft to shift the lever.

8. A device of the character described, comprising a bearing having a threaded shank portion, an operating shaft section supported by said bearing, a complemental section telescopically associated with said first mentioned section, a bearing cap engaging said telescopic section and having a threaded engagement with said bearing to maintain said complemental section in position, a lever operatively associated with said shaft, and an operating handle for shifting the shaft.

9. A flushing mechanism for closet tanks comprising a bearing having a threaded portion adapted to extend through an opening in a closet tank wall, a shaft section supported in said bearing, a complemental section telescopically engaging said first mentioned section capable of a longitudinal adjustment, but rotatable with said first section as a unit, a bearing cap disposed on one side of the tank wall and having a threaded engagement with said bearing to maintain the complemental shaft section in position, a lever mounted on the shaft and a handle for operating said lever.

10. A device of the character described comprising a bearing member adapted to be inserted in an opening in a tank wall, of a lever operating shaft composed of sections having a non-rotative connection with each other, one of said sections being carried by said bearing member, a bearing cap cooperating with and engaging said bearing to retain the other shaft section in position, a handle for operating said shaft, and lever operating means carried by said shaft.

OSCAR H. THELEEN.